United States Patent
Harel et al.

(10) Patent No.: US 12,322,263 B2
(45) Date of Patent: Jun. 3, 2025

(54) WIRELESS LOW-POWER FLAME DETECTOR

(71) Applicant: Spectronix Ltd., Sderot (IL)

(72) Inventors: Boaz Harel, Tel Aviv (IL); Tsviel Bouhbut, Be'er Sheva (IL); Dimitriy Grigorovitch, Be'er Sheva (IL); Yossi Ben-Aderet, Zikim (IL)

(73) Assignee: Spectronix Ltd., Sderot (IL)

(*) Notice: Subject to any disclaimer, the term of this patent is extended or adjusted under 35 U.S.C. 154(b) by 0 days.

(21) Appl. No.: 18/179,494

(22) Filed: Mar. 7, 2023

(65) Prior Publication Data
US 2024/0304072 A1    Sep. 12, 2024

(51) Int. Cl.
*G08B 17/10* (2006.01)
*G08B 25/10* (2006.01)
*G08B 29/04* (2006.01)

(52) U.S. Cl.
CPC .......... *G08B 17/10* (2013.01); *G08B 25/10* (2013.01); *G08B 29/043* (2013.01)

(58) Field of Classification Search
CPC .............................. G08B 17/10; G08B 29/043
See application file for complete search history.

(56) References Cited

U.S. PATENT DOCUMENTS

| | | | | |
|---|---|---|---|---|
| 6,153,881 A * | 11/2000 | Castleman | ............. | G08B 17/12 250/339.14 |
| 7,361,948 B2 * | 4/2008 | Hirano | ................... | G02B 5/284 257/E31.121 |
| 7,623,028 B2 * | 11/2009 | Kates | ................. | G01N 33/0075 340/521 |
| 8,547,238 B2 * | 10/2013 | Harchanko | .......... | G08B 29/188 340/447 |
| 9,265,001 B1 * | 2/2016 | Tannenbaum | .... | H04W 52/0235 |
| 10,467,874 B2 | 11/2019 | Fischer et al. | | |
| 2016/0042638 A1 * | 2/2016 | Sangha | ................. | G08B 29/26 340/628 |

(Continued)

FOREIGN PATENT DOCUMENTS

DE    202020106475 U1    1/2021

OTHER PUBLICATIONS

Hafner et al., "Wireless Fire Protection Technology", White Paper, Siemens, Jul. 30, 2017, 12 pages.

(Continued)

*Primary Examiner* — John A Tweel, Jr.
(74) *Attorney, Agent, or Firm* — Christopher R. Christenson; Kelly, Holt & Christenson, P.L.L.C.

(57) ABSTRACT

A wireless flame detector includes at least one optical sensor having an electrical characteristic that varies with incident radiation. Measurement circuitry is coupled to the at least one optical sensor and is configured to provide an indication relative to the electrical characteristic of the at least one optical sensor. A controller is coupled to the measurement circuitry to receive the indication and is configured to operate in a low-power mode during which a key flame indicator is monitored, and a second mode that provides full flame detection processing. The controller is configured to enter the second mode upon detection of an event while operating in the first mode. A method of operating a wireless, low-power flame detector is also provided.

16 Claims, 4 Drawing Sheets

(56) References Cited

U.S. PATENT DOCUMENTS

2019/0180590 A1 6/2019 Fischer et al.
2022/0228915 A1* 7/2022 Timler .................. A62C 37/40

OTHER PUBLICATIONS

Edward Naranjo, "Select the Right Flame Detector", Emerson Automation Solutions, Mar. 2019, 4 pages.
International Search Report and Written Opinion for PCT Application No. PCT/IL2024/050244, Dated May 23, 2024, 9 pages.

* cited by examiner

WIRELESS LOW-POWER FLAME DETECTOR

BACKGROUND

The process control and monitoring industry supports a wide range of process industries. Some of the process industries may employ or process materials that are highly flammable or even explosive. Examples of such industries include chemical processing facilities as well as petroleum extraction and refining. In such environments, fires and explosions are a significant hazard. In fact, operation of electrical devices in such environments is often subject to regulations with respect to electrical power levels as well as the housings of such electrical devices.

In some instances, the power levels are subject to one or more intrinsic safety specifications, such that even during an electrical fault, the device will not be able to cause the potentially explosive atmosphere to ignite. An example of an intrinsic safety specification is the standard promulgated by Factory Mutual Research in October 1998 entitled APPROVAL STANDARD INTRINSICALLY SAFE APPARATUS AND ASSOCIATED APPARATUS FOR USE IN CLASS I, II, AND III, DIVISION 1 HAZARDOUS (CLASSIFIED) LOCATIONS, CLASS NUMBER 3610. Intrinsic safety requirements generally specify such low energy levels that compliance is simply not possible with circuitry that involves high voltages, high currents, and/or high wattage, such as AC circuits.

The housings of electrical devices are sometimes required to be explosion-proof, meaning that should an ignition occur within the electrical device, the flame or explosion is not able to reach the outside of the explosion-proof housing. One example of an explosion-proof rating is an ATEX certification to Ex-d standards EN60079-0 and EN60079-1 for potentially explosive atmospheres. Generally, explosion-proof housings are relatively bulky in order to be mechanically robust enough to contain an internal explosion without rupturing. Generally, such explosion-proof containers are very robust metal enclosures that are designed to withstand explosive pressures. However, for optical devices, the enclosure must accommodate a window of some sort in order to allow the illumination to pass through to the environment.

In these highly volatile environments, it is useful and sometimes required to use one or more flame detectors such that any flame in the process environment can be quickly detected and extinguished. Flame detectors, unlike residential smoke detectors, are optical devices that are sensitive to the radiant emissions of the flame and often employ UV and/or IR sensors for such purpose.

Industrial regulations, such as EN54 part 25, provide additional challenges with respect to alarm transmission time and battery life. Given the nature of detection using radiant emissions and the required operating specifications, current designs have been limited.

Providing a wireless, battery powered, flame detector with improved power consumption/management would benefit the art and allow such devices to be used in more and more locations thereby improve process safety in such sensitive locations.

SUMMARY

A wireless flame detector includes at least one optical sensor having an electrical characteristic that varies with incident radiation. Measurement circuitry is coupled to the at least one optical sensor and is configured to provide an indication relative to the electrical characteristic of the at least one optical sensor. A controller is coupled to the measurement circuitry to receive the indication and is configured to operate in a low-power mode during which a key flame indicator is monitored, and a second mode that provides full flame detection processing. The controller is configured to enter the second mode upon detection of an event while operating in the first mode. A method of operating a wireless, low-power flame detector is also provided.

DETAILED DESCRIPTION OF ILLUSTRATIVE EMBODIMENTS

Figure 1:
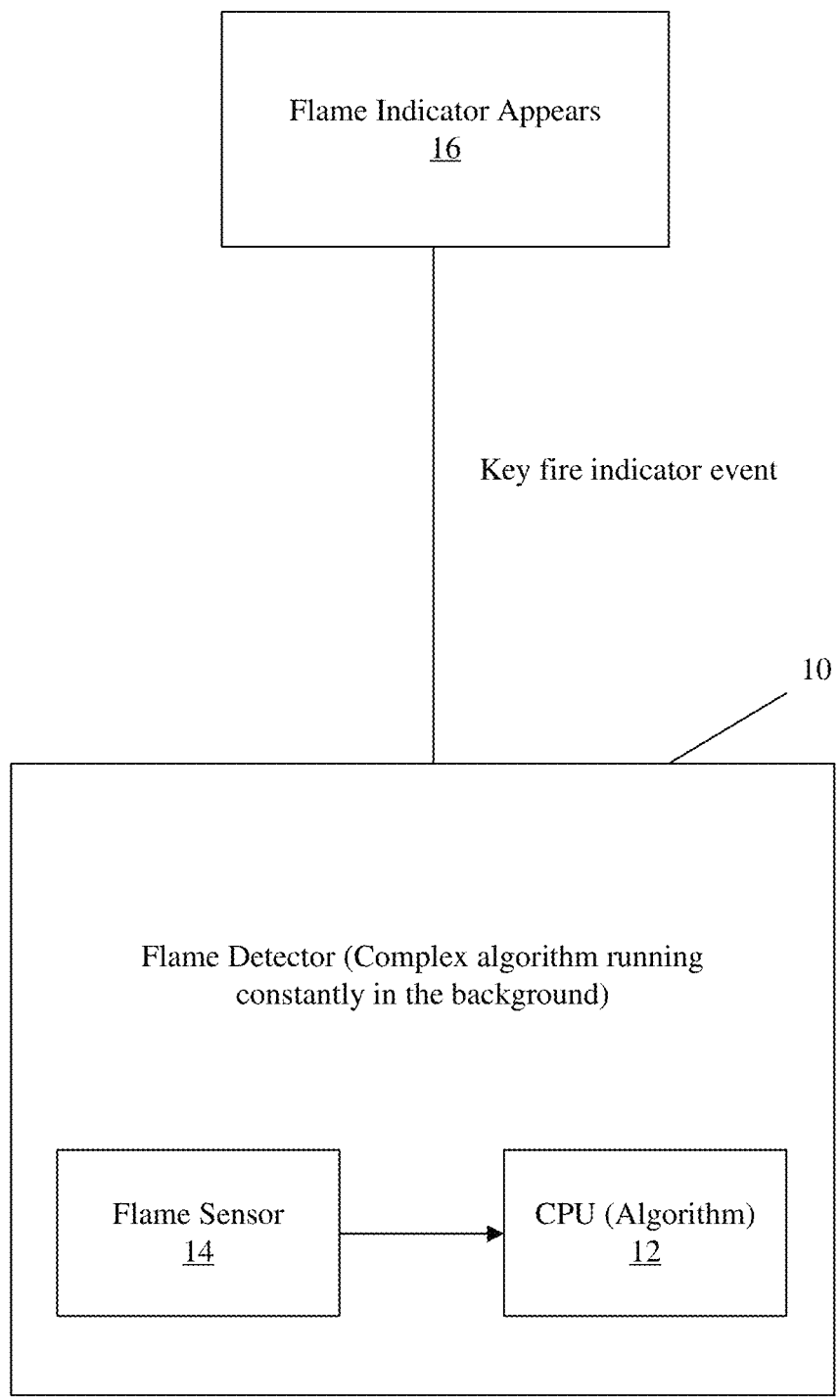
FIG. 1 is a flow diagram of a method of operating an industrial optical flame detector.

FIG. 1 is a flow diagram of a method of operating an industrial optical flame detector. Modern industrial flame detection systems, such as system 10, are based on a process of active, constant monitoring of the environment. As shown in FIG. 1, system 10 uses a central processing unit 12 to constantly monitor the signal from flame sensor 14 in order to detect an indication of flame 16. The flame detection sequence is based on a relatively complex processing technique that is designed to eliminate false alarms. However, the complex processing requires significant energy, and this leads to high infrastructure costs and complexity. The power requirements of executing the complex processing have generally required that the flame detector be hardwired to the process. However, hardwiring the flame detector adds the expense and time of wiring, which increases the cost of the initial installation as well as any subsequent relocation of the flame detector. As described herein, a wireless, low-power flame detector is a device that is not coupled to any wires whatsoever. Thus, any communication with the flame detector is done wirelessly and the flame detector is not powered by any wires coupled to it.

Embodiments described herein generally provide a wireless, low-power flame detector that includes a low power sleep mode during which key fire indicators are constantly monitored, but during which, complex, anti-false alarm processing is not. The system monitors the key fire indicators using very low power and is configured to be sensitive only to a very narrow optical wave spectrum according to the wavelength of fire radiation. Once the very low power operation identifies an event based on monitoring the key fire indicators, the system is triggered to wake up and execute the complex, anti-false alarm processing to verify the existence of the fire.

Figure 2:
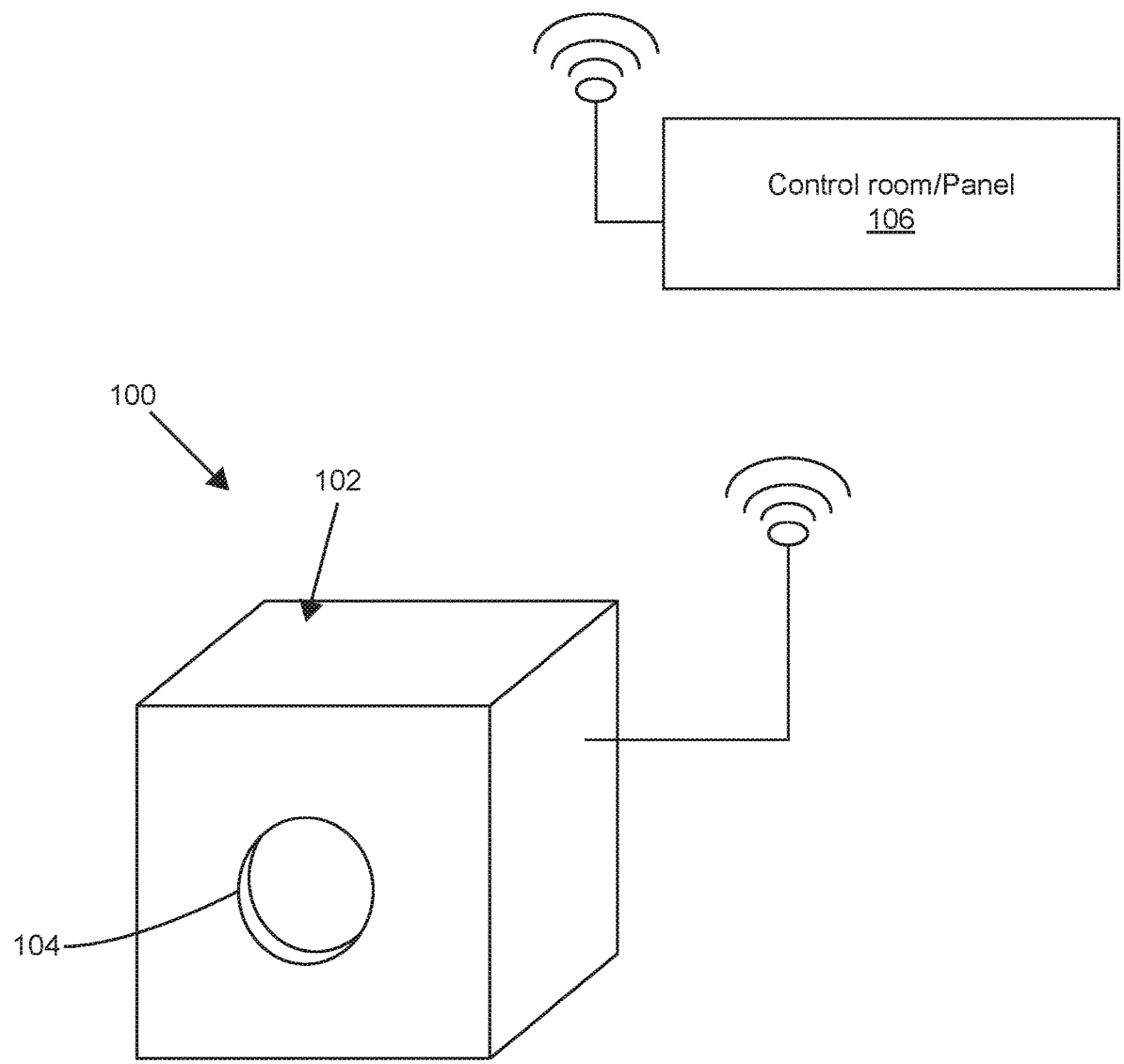
FIG. 2 is a diagrammatic view of an industrial optical flame detector in accordance with an embodiment of the present invention.

FIG. 2 is a diagrammatic view of an industrial optical flame detector in accordance with an embodiment of the present invention. Flame detector 100 includes a metal housing 102 having an optical window 104 through which flame detector 100 detects flame. Flame detector 100 communicates wirelessly with control room/panel 106. In some embodiments, housing 102 may be Explosion-proof and/or circuitry within housing 102 may conform to an Intrinsic Safety specification. When flame detector 100 detects a flame in its environment, it communicates the flame detection to control room/panel 106 wirelessly.

Figure 3:
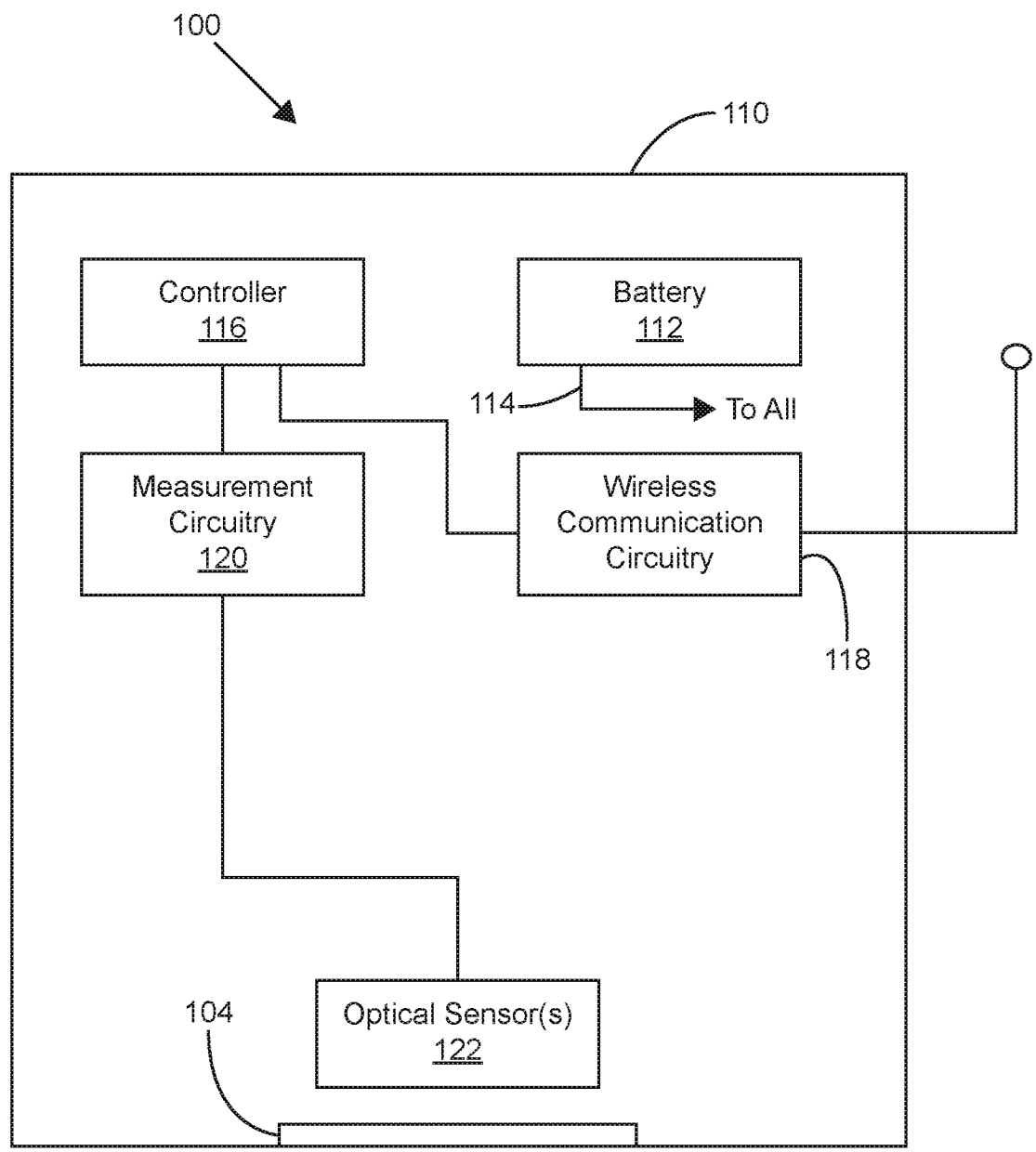
FIG. 3 is a block diagram of circuitry of an industrial optical flame detector in accordance with an embodiment of the present invention.

FIG. 3 is a block diagram of circuitry of an industrial optical flame detector in accordance with an embodiment of the present invention. Circuitry 110 of flame detector 100 includes a battery 112 that is configured to provide sufficient operating energy to all components of flame detector 100, as indicated at reference numeral 114. In some embodiments, battery 112 may be a rechargeable battery, such as a rechargeable lithium-ion battery. Preferably, the battery is configured to be field-replaceable.

Circuitry 110 also includes controller 116, which is configured to execute a sequence of instructions stored within internal memory, or external memory coupled to controller 116, to provide flame detection. Controller 116 may be any suitable combination of hardware or software to perform the necessary processing for flame detection. Controller 116 may be or include a field programmable gate array (FPGA), an application specific integrated circuit (ASIC), microprocessor or microcontroller. Controller 116 preferably includes a low-power sleep mode and may have an adjustable clock such that it operates at a lower frequency when in the low-power mode. As used herein, a low-power sleep mode includes any mode that operates at a lower power level than normal controller operation. Various techniques can be used for reducing the power of the controller in sleep mode. In one example, the controller may cease or reduce performance of computations, although it will retain any current data. In another example, some or all peripheral functions may be reduced or disabled. In one embodiment, controller 116 is a microprocessor. Controller 116 will enter into a low-power sleep mode and continuously check for detection of one or more key flame indicators while in the low-power mode. While in low-power sleep mode, complex power consuming processes are not employed in the background. Then, when a key flame indicator is detected, controller 116 exits low-power sleep mode and performs complex flame detection processing including complex anti-false alarm processing. Controller 116 preferably will remain in active mode until the flame is no longer detected, at which point it will enter low-power sleep mode once again.

Controller 116 is coupled to wireless communication circuitry 118. Wireless communication circuitry 118 preferably provides bi-directional communication to controller 116. However, embodiments can be practiced where wireless communication circuitry 118 is only configured for transmitting information to one or more remote devices. Wireless communication circuitry can employ any suitable wireless communication protocol or frequency now known or later developed to send flame detection information to control room/panel 106 (shown in FIG. 2). Examples of suitable wireless communication protocols/frequencies include: GSM networks including those operating upon 850 megahertz; 900 megahertz; 1800 megahertz; and 1900 megahertz; code division multiple access (CDMA); IEEE 802.11b; IEEE 802.11g; IEEE 802.11n; IEEE 802.11a; Bluetooth; WiMax (IEEE 802.16 standard); IEEE 802.15.4; and WirelessHART (IEC62591).

As shown in FIG. 3, circuitry 110 also includes measurement circuitry 120 that is coupled to or included within controller 116. Measurement circuitry 120 provides digital indications with respect to measurements obtained from one or more optical sensors 122. Measurement circuitry 120 can include one or more analog-to-digital converters and/or suitable multiplexing circuitry to interface the one or more analog-to-digital converters to sensors 122. Additionally, measurement circuitry 120 can include suitable amplification and/or linearization circuitry as may be appropriate for the various types of optical sensors employed.

Optical sensor(s) 122 include any suitable device that has an electrical characteristic that varies with incident electromagnetic radiation. The electromagnetic radiation may be in the visible spectrum or non-visible spectrum, such as IR and/or UV. Optical sensor(s) 122 are disposed proximate window 104 such that radiant energy passing through window 104 is detected by optical sensor(s) 122. Suitable examples of optical sensors include, without limitation, a photodiodes, a phototransistor, a charge-coupled device (CCD), and a complementary metal-oxide semiconductor (CMOS) device. Additionally, optical sensor(s) 122 include combinations of devices, whether of the same type (i.e., an IR photodiode operating in conjunction with a UV photodiode) of or different types (i.e., an IR photodiode operating in conjunction with a CMOS sensor).

Figure 4:
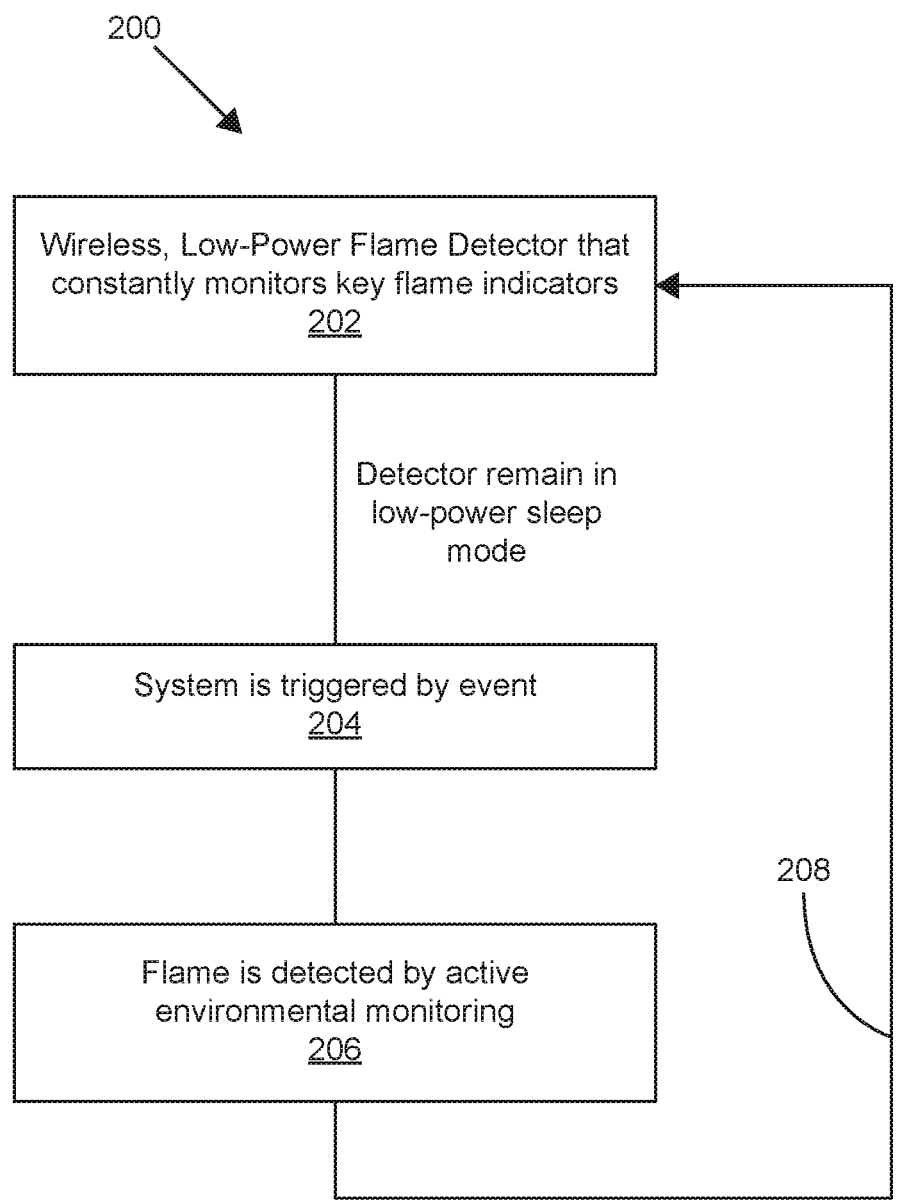
FIG. 4 is a flow diagram of a method of operating an industrial optical flame detector in accordance with an embodiment of the present invention.

FIG. 4 is a flow diagram of a method of operating an industrial optical flame detector in accordance with an embodiment of the present invention. Method 200 begins at block 202 where a wireless, low-power flame detector enters a low-power mode and continuously checks for detection of one or more key flame indicators while in the low-power mode. In embodiments, that employ a controller having a low-power mode, the controller is placed in the low-power mode during the execution of block 202. Additionally, or alternatively, only optical sensor(s) 122 that provide low power operation, such as a low power phototransistor, are used during block 202. Notably, during the execution of block 202, complex power consuming processes are not employed in the background. In one example, a key fire indicator monitored during block 202, is radiant energy in the ultraviolet spectrum, for example, having a wavelength in the range of 10 to 400 nanometers. One or more additional optical sensor(s) 122 may also be used during the low-power mode. For example, an IR optical sensor (having a relatively narrow optical spectrum sensitivity of around 4-4.5 um) can also be used to detect the flame's presence quickly and further improve the differentiation of flame sources from non-flame background radiation. When the system detects a signal from one or more of the optical sensors, method 200 transitions to block 204 where the system is triggered to exit its low-power mode and perform complex flame detection processing including complex anti-false alarm processing, as indicated at block 206. During this state, the complex flame detection processing can be the same as that used in prior techniques, or may include a combination of prior techniques and the data/signals obtained during the low-power operation. If, at block 206, controller 116 (shown in FIG. 3) determines that the detection is not a false alarm, then the flame detection is communicated to one or more remote devices using wireless communication circuitry 118 (shown in FIG. 3). Preferably, the system will remain in the full-power mode until the flame is no longer detected, at which point it will return to low-power operation as indicated at reference numeral 208.

As can be appreciated, embodiments described herein generally provide a wireless low-power flame detector that is able to monitor one or more key fire indicators that are at very low power and are sensitive to a very narrow optical wave spectrum according to the wavelength of the fire radiation. Once the system is triggered by an event, it exits its low-power operation and provides full flame detection processing. In one example, this basically adds an additional ultraviolet sensor layer that triggers the system to wake-up. By using embodiments described herein, the flame detector will remain in low-power mode for most of the time, thereby facilitating extended battery operation.

Although the present invention has been described with reference to preferred embodiments, workers skilled in the art will recognize that changes may be made in form and detail without departing from the spirit and scope of the invention.

What is claimed is:

1. A wireless flame detector comprising:
   a battery;
   at least one optical sensor having an electrical characteristic that varies with incident radiation within a wavelength band of flame;
   measurement circuitry coupled to the at least one optical sensor and the battery, the measurement circuitry being configured to provide an indication relative to the electrical characteristic of the at least one optical sensor;
   a controller coupled to the measurement circuitry and battery, the controller being configured to receive the indication, the controller being configured to operate in a low-power mode during which the electrical characteristic of the at least one optical sensor is continuously monitored, and a second mode that provides full flame anti-false alarm processing, wherein the controller is configured to enter the second mode upon detection of an event while operating in the first mode; and
   wireless communication circuitry operable coupled to the battery and the controller and configured to selectively communicate wirelessly with at least one remote device based on the full flame anti-false alarm processing.

2. The wireless flame detector of claim 1, wherein the at least one optical sensor includes a photodiode.

3. The wireless flame detector of claim 1, wherein the at least one optical sensor includes a phototransistor.

4. The wireless flame detector of claim 1, wherein the at least one optical sensor is configured to be sensitive to radiation in an optical band of 4-4.5 um.

5. The wireless flame detector of claim 1, wherein the at least one optical sensor is configured to be sensitive to radiation in the ultraviolet spectrum.

6. The wireless flame detector of claim 1, wherein the at least one optical sensor includes a plurality of optical sensors, the plurality of optical sensors including a first optical sensor sensitive to ultraviolet radiant energy, and a second optical sensor sensitive to infrared radiant energy.

7. The wireless flame detector of claim 1, and further comprising a metal housing containing the at least one optical sensor, the measurement circuitry, and the controller.

8. The wireless flame detector of claim 7, wherein the metal housing includes an optical window.

9. The wireless flame detector of claim 8, wherein the at least one optical sensor is disposed proximate the optical window.

10. The wireless flame detector of claim 9, wherein the metal housing is explosion-proof.

11. A method of operating a wireless flame detector, the method comprising:
    providing a controller having a plurality of processing modes, the plurality of processing modes including a first mode and a second mode, wherein power consumption of the controller during the first mode is lower than power consumption during the second mode;
    continuously monitoring optical radiation in a band of wavelengths of flame using an optical sensor while the controller is in the first mode;
    selectively transitioning to the second mode when a flame event is detected during the first mode;
    performing false alarm flame detection processing with the second mode; and
    selectively providing a flame detection output using wireless communication based on the false alarm flame detection processing.

12. The method of claim 11, and further comprising returning to the first mode after providing the flame detection output.

13. The method of claim 11, wherein monitoring at least one key flame indicator while the controller is in the first mode includes monitoring ultraviolet radiation in an environment of the wireless flame detector.

14. The method of claim 13, wherein performing flame detection processing includes processing one or more optical sensor signals to provide anti-false alarm functionality.

15. The method of claim 11, wherein an additional optical sensor signal is used during the second mode.

16. The method of claim 15, wherein flame detection processing is based on signals from a plurality of optical sensors.

* * * * *